United States Patent [19]
Hurley et al.

[11] Patent Number: 5,453,587
[45] Date of Patent: Sep. 26, 1995

[54] TRANSPORTABLE REMOTELY ACTUATED RACKING DEVICE FOR USE WITH HIGH VOLTAGE INDUSTRIAL CIRCUIT BREAKERS

[75] Inventors: James E. Hurley, Westlake, La.; Edward C. Cox, Orange, Tex.; Elmer S. Hyde, Jr., DeQuincy, La.

[73] Assignee: Gulf States Utilities Company, Beaumont, Tex.

[21] Appl. No.: 124,694

[22] Filed: Sep. 20, 1993

(Under 37 CFR 1.47)

[51] Int. Cl.$^6$ .............................. H01H 9/20; H01H 33/46
[52] U.S. Cl. ..................... 200/50 AA; 218/154; 361/606
[58] Field of Search .................. 200/50 R–50 C, 200/18, 144 R, 17 R; 361/605–610, 615

[56] References Cited

U.S. PATENT DOCUMENTS

| | | | |
|---|---|---|---|
| 2,615,101 | 10/1952 | Caswell | 200/50 |
| 2,861,699 | 11/1958 | Youmans | 214/1 |
| 3,171,920 | 3/1965 | Klein et al. | 200/92 |
| 3,198,907 | 8/1965 | Archer et al. | 200/92 |
| 3,235,681 | 2/1966 | Pokorny et al. | 200/50 |
| 3,296,565 | 1/1967 | Kiesel et al. | 335/69 |
| 3,823,281 | 7/1974 | Wilson | 200/50 AA |
| 4,652,202 | 3/1987 | Kersten | 414/648 |
| 4,912,380 | 3/1990 | Zylstra et al. | 358/285 |
| 4,990,873 | 2/1991 | Grunert et al. | 335/68 |
| 5,160,908 | 11/1992 | Mullins et al. | 335/68 |

*Primary Examiner*—A. D. Pellinen
*Assistant Examiner*—Michael A. Friedhofer
*Attorney, Agent, or Firm*—Jackson & Walker

[57] ABSTRACT

A transportable, remotely actuated racking device is provided for use in connection the insertion and removal of very high voltage industrial circuit breakers. The device includes a motor activated rod assembly which is moved between first and second positions for grasping of the circuit breaker during insertion and removal from the circuit breaker housing. The racking device is remotely operated from a point of safety relative to the circuit breaker whereby direct exposure to possible fire and explosions which might occur during racking is greatly reduced.

16 Claims, 16 Drawing Sheets

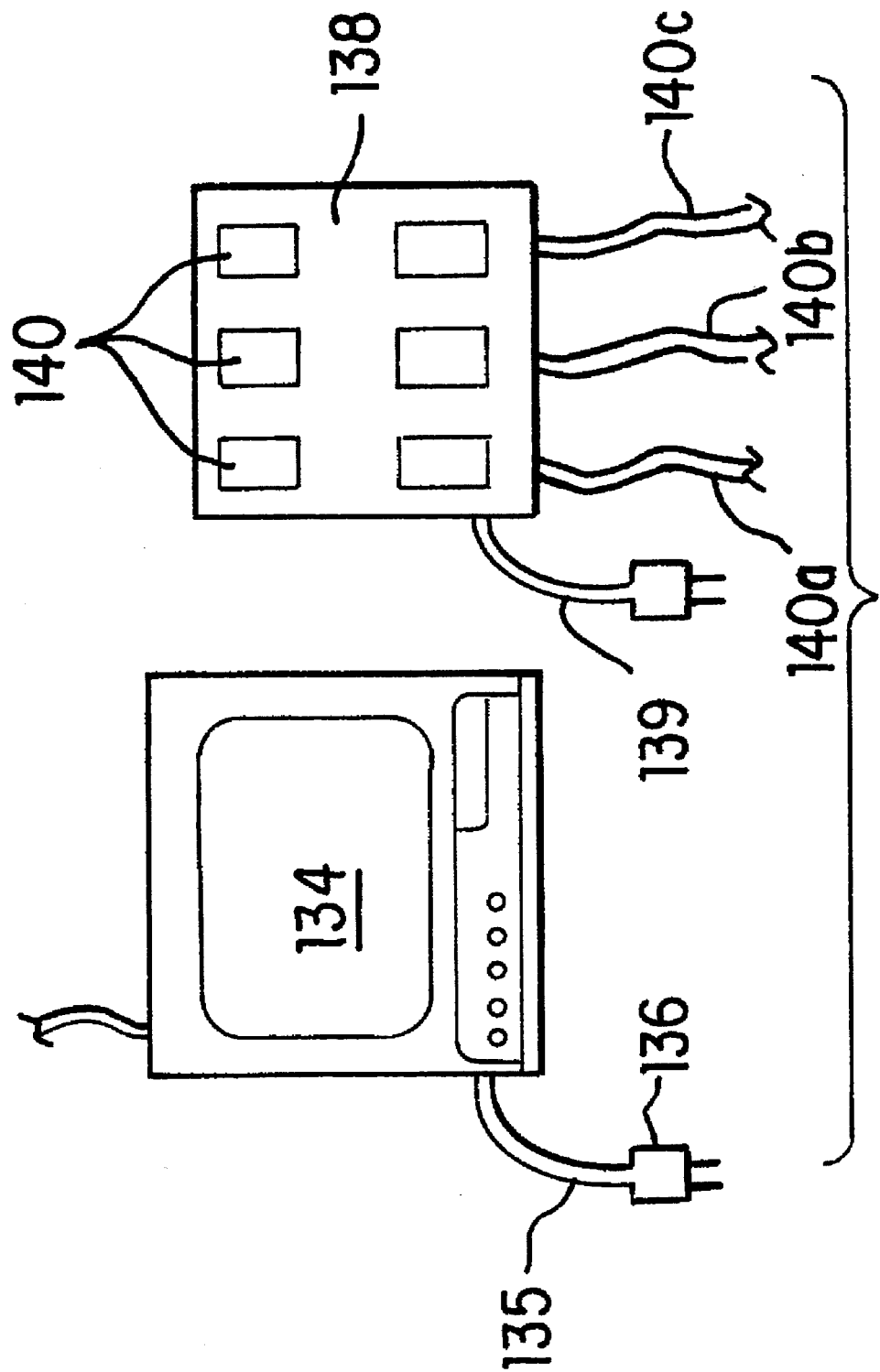

5,453,587

TRANSPORTABLE REMOTELY ACTUATED RACKING DEVICE FOR USE WITH HIGH VOLTAGE INDUSTRIAL CIRCUIT BREAKERS

BACKGROUND OF THE INVENTION

1. Field of the Invention

The invention relates to a transportable remotely actuated racking device for use in connection with insertion and removal of very high voltage industrial electric circuit breakers relative to housings therefor.

2. Brief Description of the Part

In many industrial applications, such as generator or transmission stations and points for the generation and transmission of electrical energy, very high amperes, high voltage circuit breakers are used in establishing and breaking high voltage circuits. Such circuit breakers also are utilized in electronic components within and to large electric motors for aircraft carrier components, large field operation stations, and the like wherein the electric power is in a range of approximately two thousand to twelve thousand amperes at six hundred to six thousand volts. Such circuit breakers often are provided within housings in rows or banks, or stocks, as shown in FIG. 1.

Often times, it is necessary to insert or remove a circuit breaker within one or more of the housings forming the bank of circuit breaker housings. Such requirement is necessitated by, for example, an increase or decrease of load requirement in the particular facility, or for repair or replacement of a particular circuit breaker, or line component or the power line extending to the circuit breaker, so that the circuit breaker components will accept a lower or higher voltage and amperes conducting circuit breaker, or for various other reasons known to those skilled in the art.

In the past, the prior art sometimes has provided circuit breaker assemblies that are affixed within the circuit breaker housing, but are not designed to be transportable from one housing to another housing in the bank of circuit breakers. Some of these devices require opening of the circuit breaker housing door for activation, while others may be operated either manually, mechanically or electrically with the door remaining shut.

The procedure for inserting and removing a circuit breaker from such housing is referred to as "racking-in and/or racking-out". When the circuit breaker is "racked-in", it is in the "on" position relative to the circuit therefor, and when it is in the "racked-out", it is in the "off" or "closed" position relative to said circuit. Thus, the device utilized in such a procedure is commonly referred to by those skilled in the art of inserting and removing such circuit breakers as a "racking device".

In the past, many such circuit breakers have been "racked" by insertion within the housing, as the occasion requires, into a cog system along the floor of the circuit breaker housing which is manually affixed to one end of a circuit breaker, and thereafter, operable to engage or disengage the circuit breaker by means of application by an operator of an elongate shaft held in the hands of the operator at one end and having cog receptacle members at the other end and inserted within the cog on the floor of the circuit breaker for moving the circuit breaker into and out of the housing. The shaft is moved from one cog grooveway to another cog grooveway to continue the movement either into or out of circuit engagement of the circuit breaker, until such time as the circuit breaker is either completely affixed within the circuit breaker housing or is completely removed from circuit transmission and engagement.

Recently, certain federal and/or state governmental safety requirements have discouraged the use of such type of a racking system because of possible exposure to fire and explosions which could, although infrequently, result because of some defect or the like within the circuit breaker system. Even though working personnel operating the rack are required to, and do, wear safety shields, helmets, and fire resistant or retardant clothing, including gloves, shoes, pants and vests, such fires and explosions may be so intensive that injury, oftentimes critical, has occurred to the human operators.

While some racking devices are remotely actuatable, in a sense, that is, by closing the door to the circuit breaker housing and activating such racking assembly, such devices are somewhat unsatisfactory because such racking still requires the operator to be immediate the housing for the circuit breaker and not at a "point of safety". These racking devices also are somewhat inefficient in activation because the housings for the circuit breaker also include the racking device, itself, thus rendering such racking devices fixed as opposed to transportable, and thereby enhancing the cost of the entire circuit breaker assembly within each of the housings in the various rows and stacks of circuit breakers at the particular facility.

The present invention addresses the deficiencies as described above with respect to the prior art racking devices.

A pre-filing novelty search conducted with respect to the present invention has developed the following patents:

| U.S. Pat. No. | PATENTEE |
| --- | --- |
| 2,861,699 | Youmans |
| 3,171,920 | Klein, et al |
| 3,198,907 | Archer, et a |
| 3,296,565 | Kiessel, et al |
| 4,652,202 | Arnett |
| 4,912,380 | Zylstra, et al |
| 4,990,873 | Grunet, et al |
| 5,160,908 | Mullins, et al |

As used herein, "transportable" means the ability of the racking device of the present invention to be moved from one circuit breaker housing to another circuit breaker housing, either in the same row and/or within other rows or series of circuit breaker stacks, by one or more human operators. The term "point of safety", as used herein, means a relative distance and/or location away from the circuit breaker housing to another position whereby human operators of the racking device of the present invention may operate said racking device for racking the circuit breaker without having to activate the same by manually pushing or moving a device on or within the housing for the circuit breaker, said relative distance being on the order of from about ten feet to about sixty feet. Additionally, as used herein, the term "high-voltage" shall mean an electric power line range of between about two thousand to about twelve thousand amperes at from between about one thousand volts to about six thousand volts, or more. Finally, as used herein, the term "closed-circuit" refers to a television and a screen therefrom which receive and project video signals transmitted only from the camera during racking, as opposed to reception of a commercial television signal through commercial channels or cables having multi-channel signals received to the television and screen, and projecting thereon.

BRIEF DESCRIPTION OF THE INVENTION

A transportable remotely actuated racking device is provided for use in connection with insertion and removal of very high voltage industrial electric circuit breakers to and from housings therefor. The device comprises a base and means extending from the base for transporting the device from approximate one of the circuit breakers to a position approximate another of the circuit breakers, and for lining the device relative to the circuit breaker housings during racking.

The device further includes a rod assembly having a fixed length which communicates with the base and is selectively movable from a first position wherein the rod assembly is not in grasping relationship with the circuit breaker to a second position wherein the rod assembly is in position for establishing a grasping relationship with the circuit breaker. Motor means are provided on the base for manipulating the rod assembly between first and second positions.

At least one fixed stabilizing arm element extends from the base toward the circuit breaker housing, the arm element having a length less than that of the rod assembly. Means are provided on the arm element arranged for grasping engagement with the circuit breaker housing during racking. Grasping means are secured to one end of the rod assembly for grasping and holding a circuit breaker during racking. Finally, an activation/deactivation means is provided for the motor means and is manually manipulatable at a remote point of safety relative to the circuit breaker housing. The device may also include camera and television means for directly and remotely monitoring the racking procedure. In a preferred form, the device has a plurality of arm elements, one being fixed, and another being rotated or otherwise manipulatable from a point somewhat lateral of the fixed arm to another position in approximate lateral alignment with the fixed arm and secured in place for such position to thereby securely engage the device to the housing of the circuit breaker.

BRIEF DESCRIPTION OF THE DRAWINGS

FIG. 16 is a schematic illustration of the television monitor and switching device for use in the present invention.

DESCRIPTION OF THE PREFERRED EMBODIMENTS

Figure 1:
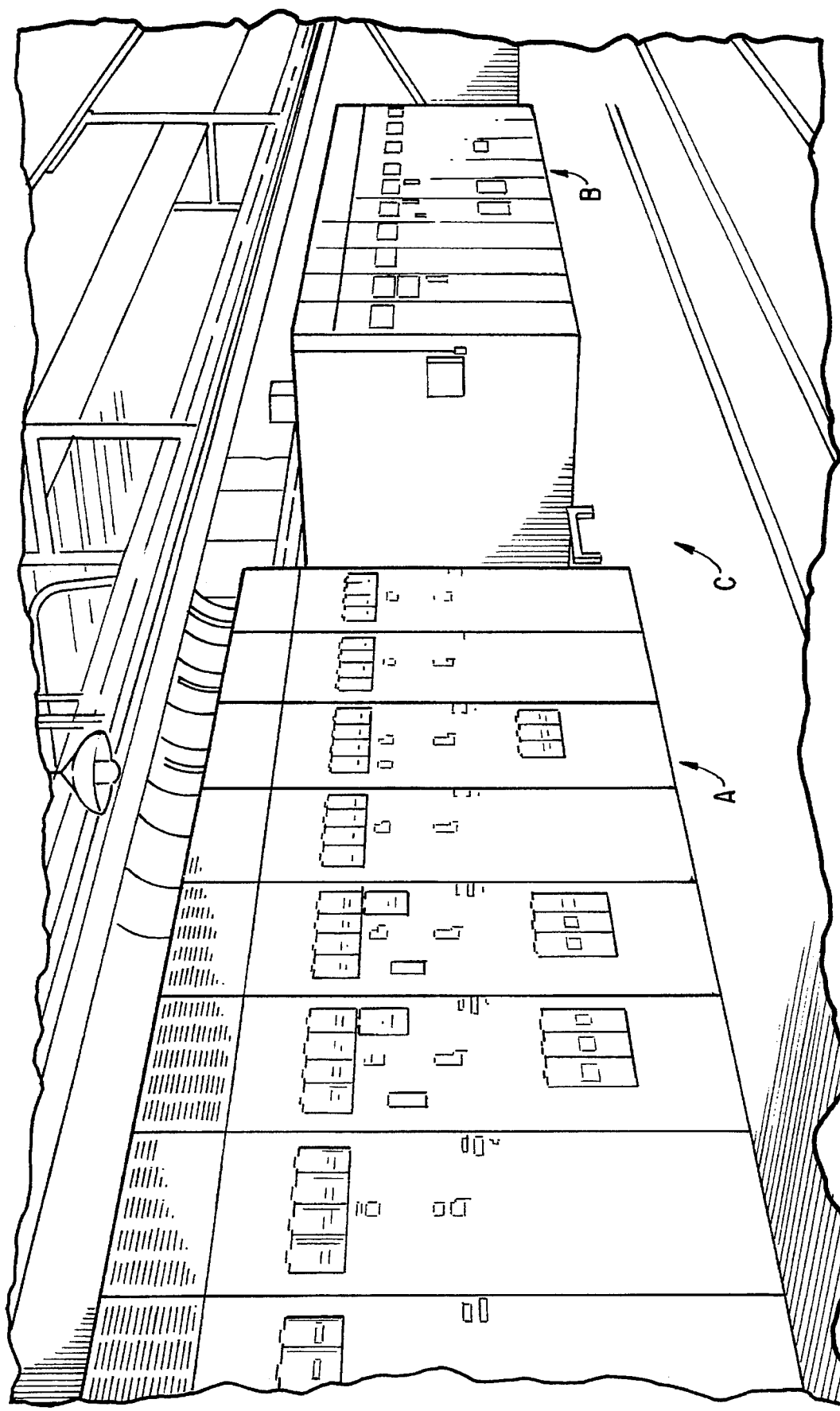
FIG. 1 is a visual illustration of a series of circuit breaker housings, as might appear in a commercial electric generating facility.

Now with particular reference to FIG. 1, stacks A and B note a circuit breaker housings in series upon a floor C of a power generating station. The stacks A and B are utilized for a number of purposes, and generally serve to activate high voltage circuits between on and off positions for actuation of motors, or the like, used in generation and transmission of electric power.

Figure 2:
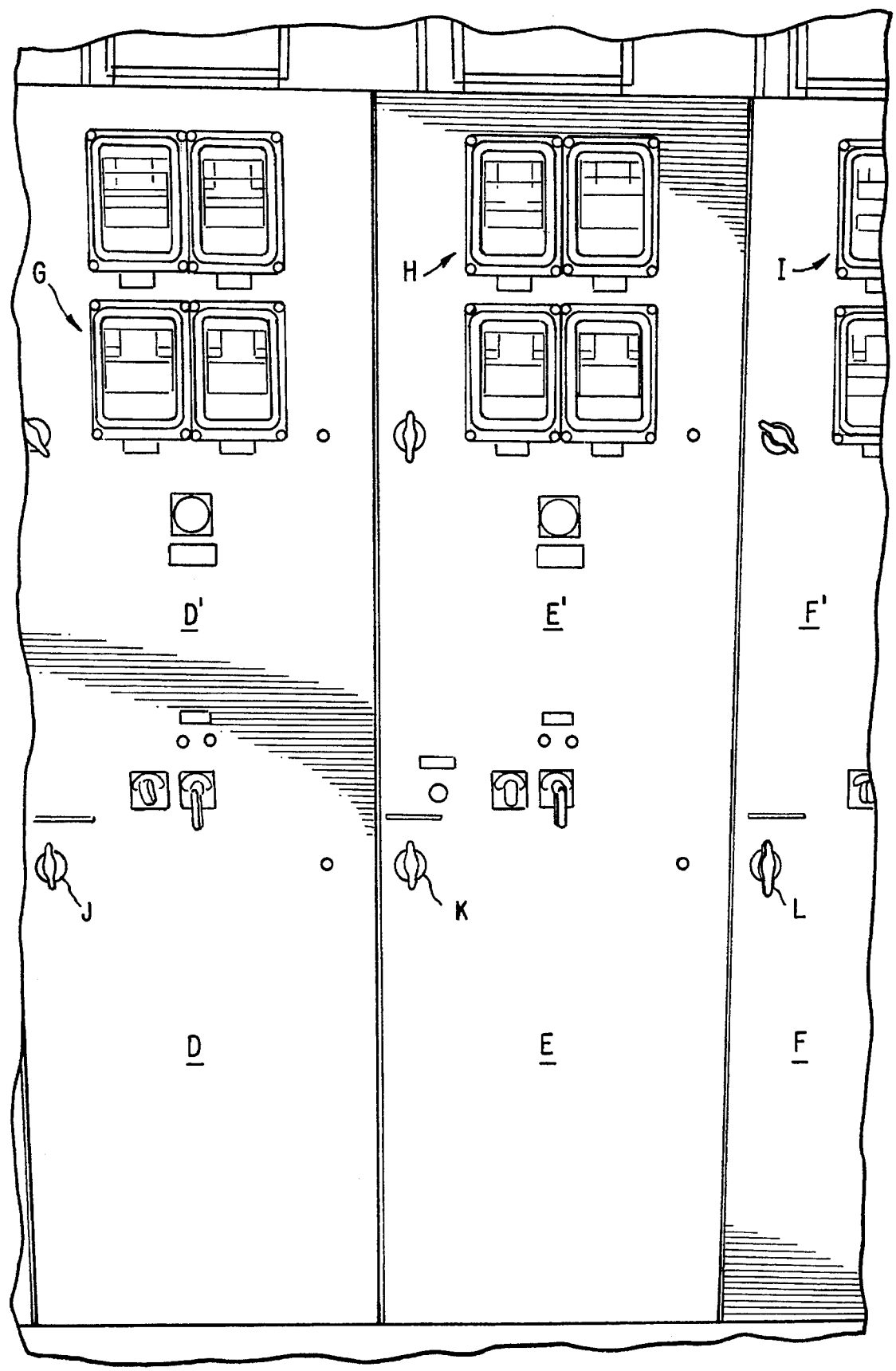
FIG. 2 is a view similar to that of FIG. 1, but showing an exploded external frontal view of a plurality of circuit breaker housings within a series or stack of circuit breaker housings.

Now, with particular reference to FIG. 2, there is shown a plurality of circuit breaker housings D, E, and F, each such housing having a frontal door D', E' and F'. Also shown on such exterior doors are respective gauges G, H and I and respective lock handles J, K and L. The handles J, K and L, are, of course, manipulated between locked and unlocked positions as well as between closed and open positions, by application of the human hand thereto.

Figure 3:
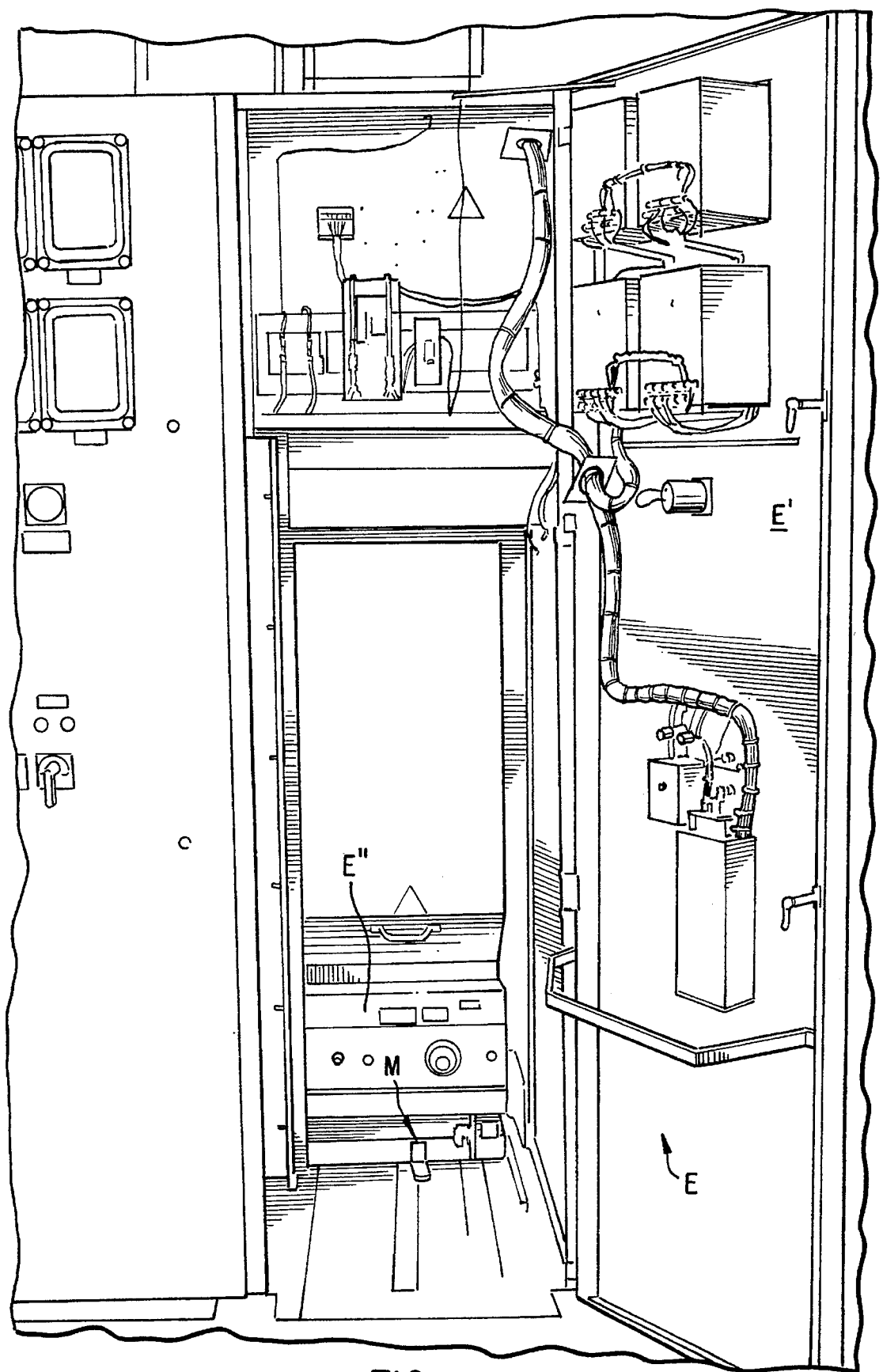
FIG. 3 is a view similar to that of FIG. 1, but showing the door to the circuit breaker housing as being in opened position.

Now with reference to FIG. 3, a circuit breaker housing E has its door E' in open position for exposure of a circuit breaker housing portion E" and the circuit breaker M. As better illustrated in FIG. 4 the circuit breaker M is received through an opening at the out-board end of a circuit breaker housing element N, the circuit breaker M having a passageway O therethrough for receipt of a locking pin 105 (FIG. 11) of the present invention during racking.

Figure 15:
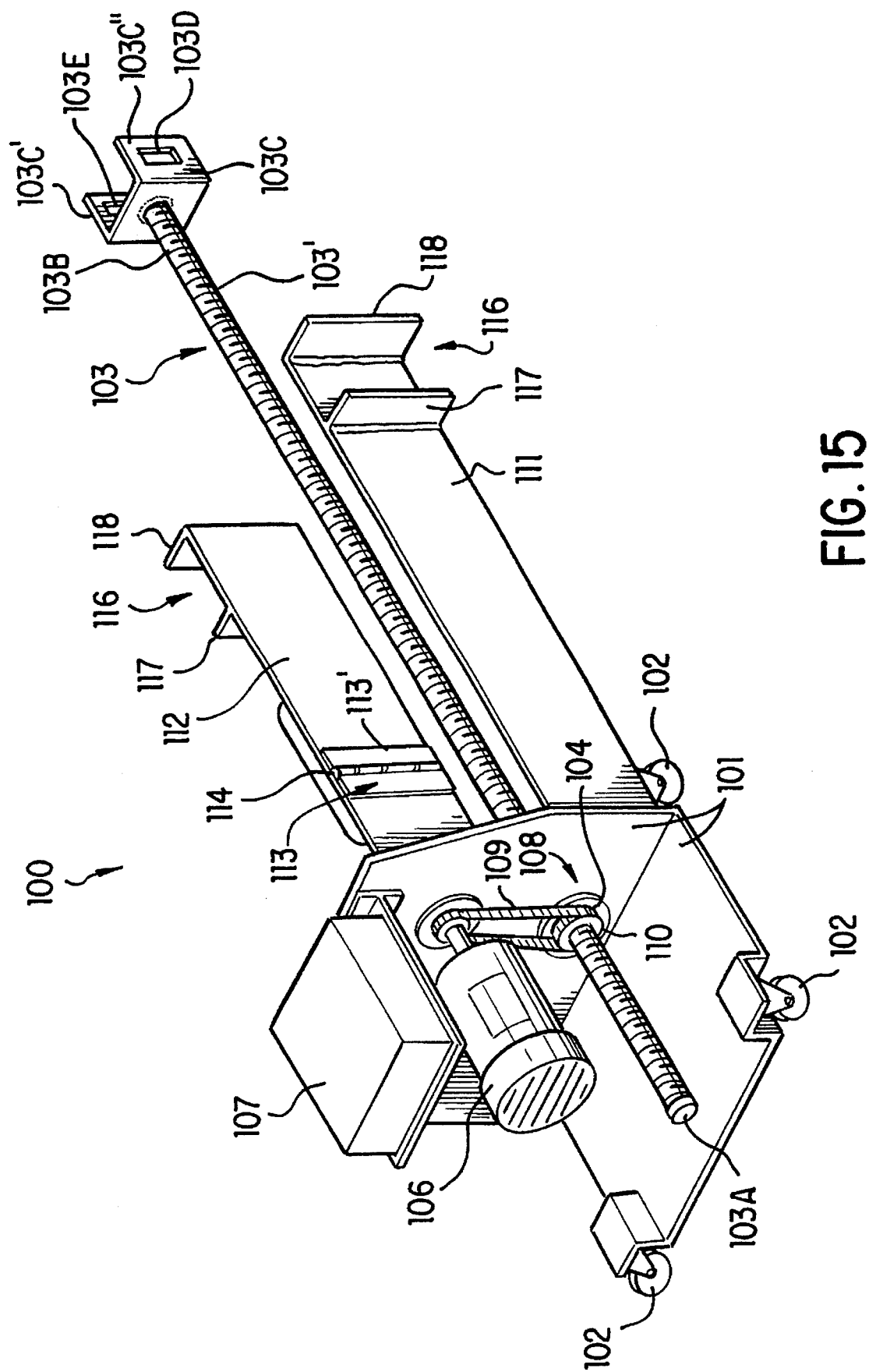
FIG. 15 is an exterior schematic illustration of the base, arms, rod assembly, motor means and gearing mechanism incorporated into the present device.

Turning now to FIG. 15, the apparatus of the present invention 100 is shown as comprising of a base 101 together with a plurality of bearing-containing wheels 102 (the fourth wheel in the series not being shown in FIG. 15). The wheels 102 serve to enable transporting of the device from one circuit breaker to another circuit breaker, and are further helpful in aligning the device relative to the circuit breaker housings during racking. As shown, each of the wheel elements 102 are rotatable 360 degrees.

Figure 4:
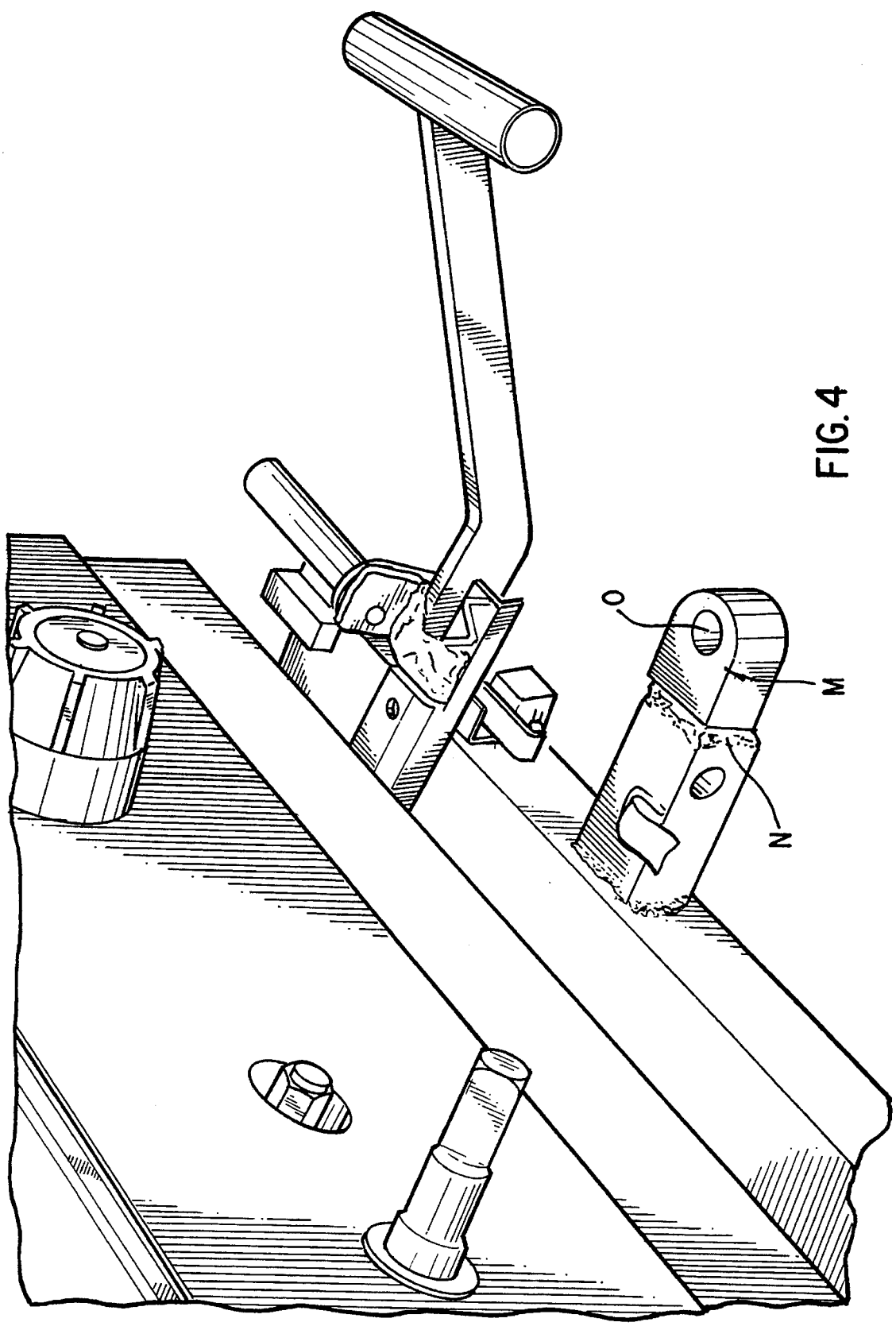
FIG. 4 is an exploded view of the circuit breaker assembly within the housing, as shown in FIG. 3, and, in particular, illustrating the circuit breaker in racked-in position.
Figure 11:
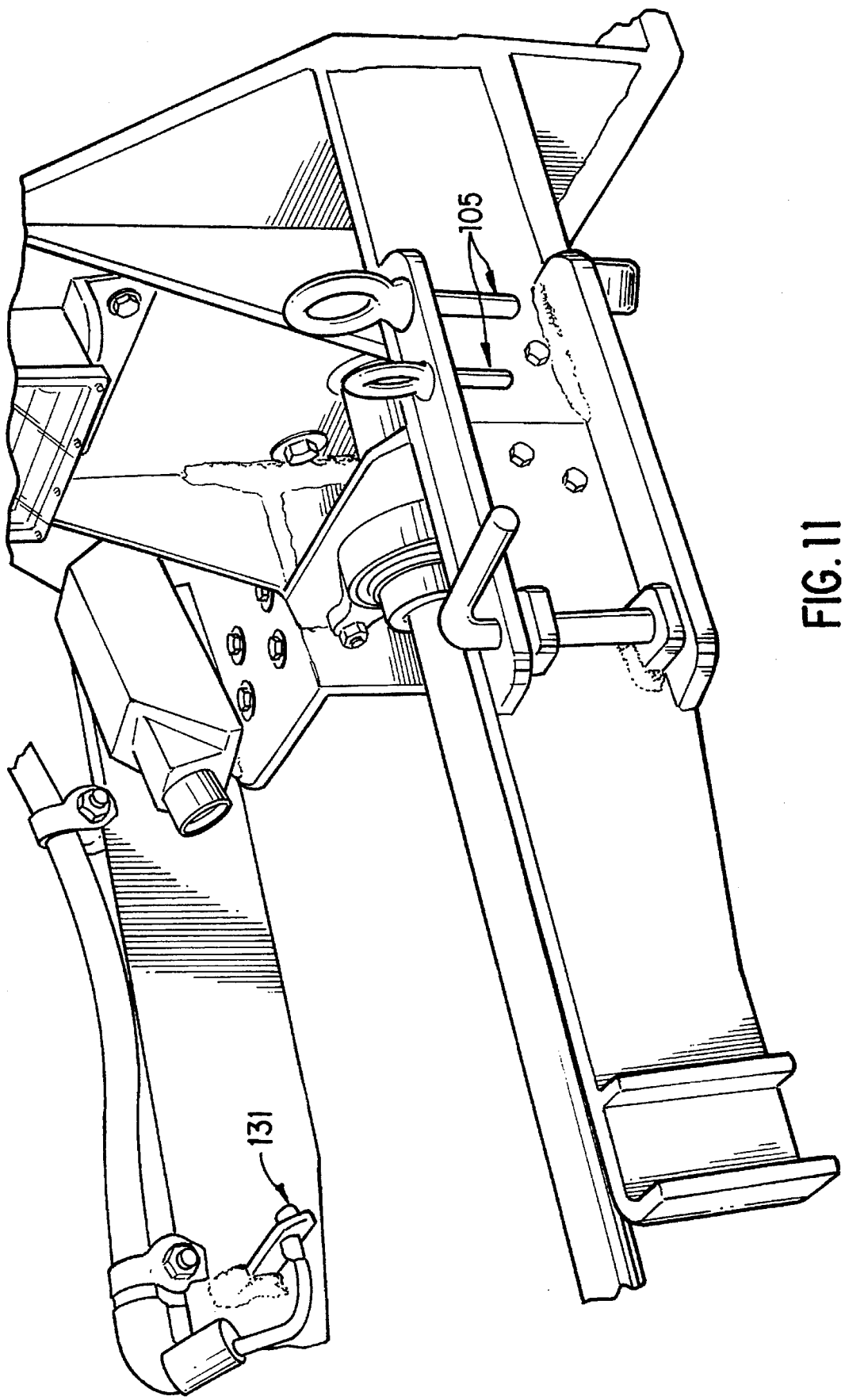
FIG. 11 is a view similar to that of FIG. 10, but illustrating the pivotable arm in locked position.

A rod assembly 103 is provided and has one end 103*a* extending through a passageway 104 in the base 101. At the distil end 103*b* of the rod assembly is affixed a U-shaped grasping means 103c having frontally extending sides 103c', 103c". Windows 103d and 103e are respectively defined within the elements 103c and 103c', and are always open for receipt of a locking pin 105 (FIG. 11). One or more locking pins 105 are disposed on one of the arms, as shown in FIG. 11, and may be shaped or otherwise sized to fit varying circuit breakers M (FIG. 4).

Motor means 106, such as an electric motor, is positioned on and carried by the base and is activated between on and off positions by means of circuitry of known construction housed in Box 107 on the base 101. The motor 106 is always in electric communication with the circuitry in Box 107, as well as electric lines (FIG. 5) extending from the Box 107. A gearing mechanism 108 extends between the rod assembly 103 and the motor means 106 by means of a gearing mechanism including a belt or a chain 109 extending from the motor means 106 to a gear 110 for transferring rotary motion into linear movements of the rod assembly 103. The mechanism 110 is well known and commercially available to those skilled in the art.

As particularly shown in FIG. 15 the rod assembly 103 has a series of circumferentially extending in engroovements 103' around the exterior thereof thus forming a screw-like configuration for cooperative interrelation with the gear 110 and the belt 109 extending from the motor means 106 to linearly move and manipulate the rod assembly 103 as a result of transfer of rotary power developed by the motor 106 and delivered therefrom by the belt 109 to the gear assembly 108.

Figure 10:
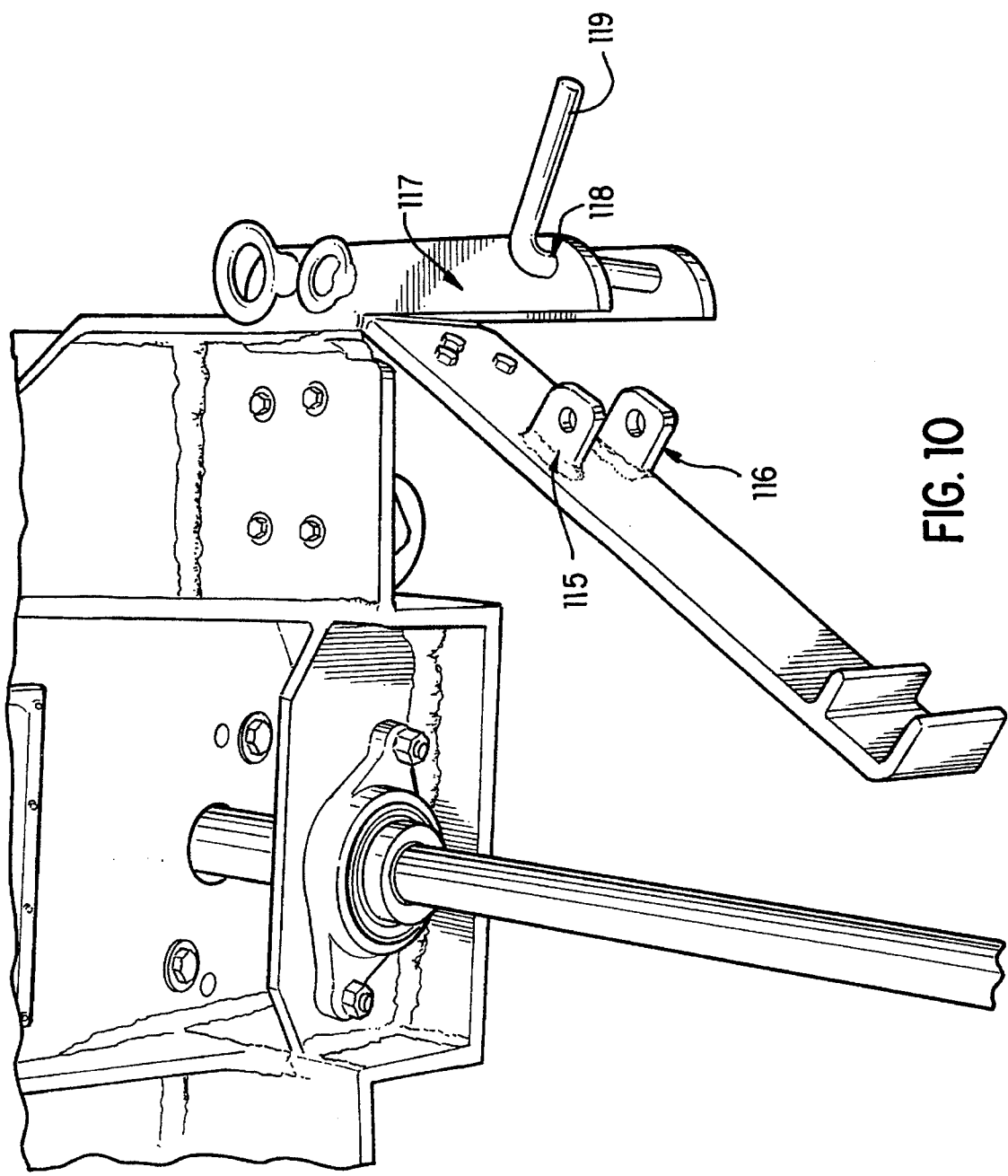
FIG. 10 is an exterior view of the racking device, looking toward the base, and particularly illustrating a pivotable second stabilizing arm in pivoted, and unlocked position relative to the first stabilized arm.

Extending from and outboard of the base 101 is a series of stabilizing arms 111 and 112. The arm 111 is always in fixed position such that it may not move pivotally or laterally of any portion of the base 101. In contrast, the stabilizing arm 112 which is also affixed to the plate 101 is partly pivotable between a position substantially parallel to that of arm 11, as shown in FIGS. 5, 7, 8 and 15, and a position as shown in FIG. 10. The arm 112 may have a plate 113 having a hinge 113' and bolt 114 assembly thereon, similar to that utilized between a home door and its frame for opening and closing of the door.

As shown in FIG. 10, the arm 112 will have slightly distil of the hinge and bolt assembly 113 and 114, a series of outwardly extending housing members 115, 116, for receipt within a fixed non-moving arm member 117 through which a passageway 118 is defined, a pin 119. By providing one fixed stabilizing arm 111 and one pivotal stabilizing arm 112 parallel to but opposite one another, the device 100 may be first manipulated into position relative to the circuit breaker housing E by aligning the passageways within the housings 115 and 116 with a passageway 118 on the arm member 117, and thereafter affixing a pin 119 (FIG. 10) through each of such passageways to thereby lock the arm 112 in position such that it is thereafter in lateral alignment relative to the arm 111. In this manner, the arm 112 is normally in a pivoted relationship relative to the stabilized arm 111 such that the device 100 may be manipulated into position with respect to the housing L for the circuit breaker and the arm 111 being secured to the housing L at outwardly extending track or groove X (FIG. 12) therearound with respect to the U-shaped element 116 having sides 117 and 118 weldedly secured to the exterior of the arm 111 for selectively grasping engagement with the circuit breaker housing in track X. After the arm 111 is in place such that the grasper 116 is in companion relationship with the track X, the arm 112 may be pivoted such that its companion grasping means 116 with walls 117, 118 now may be securingly associated with the outward track X of the housing E and secured relative thereto by manipulating the arm 112 to the position as shown in FIG. 15 and affixing therethrough the pin 119 into the passage 118. When the apparatus 100 is desired to be disengaged from the track or groove X of the housing E, the procedure, as above described, is, of course, reversed.

Figure 5:
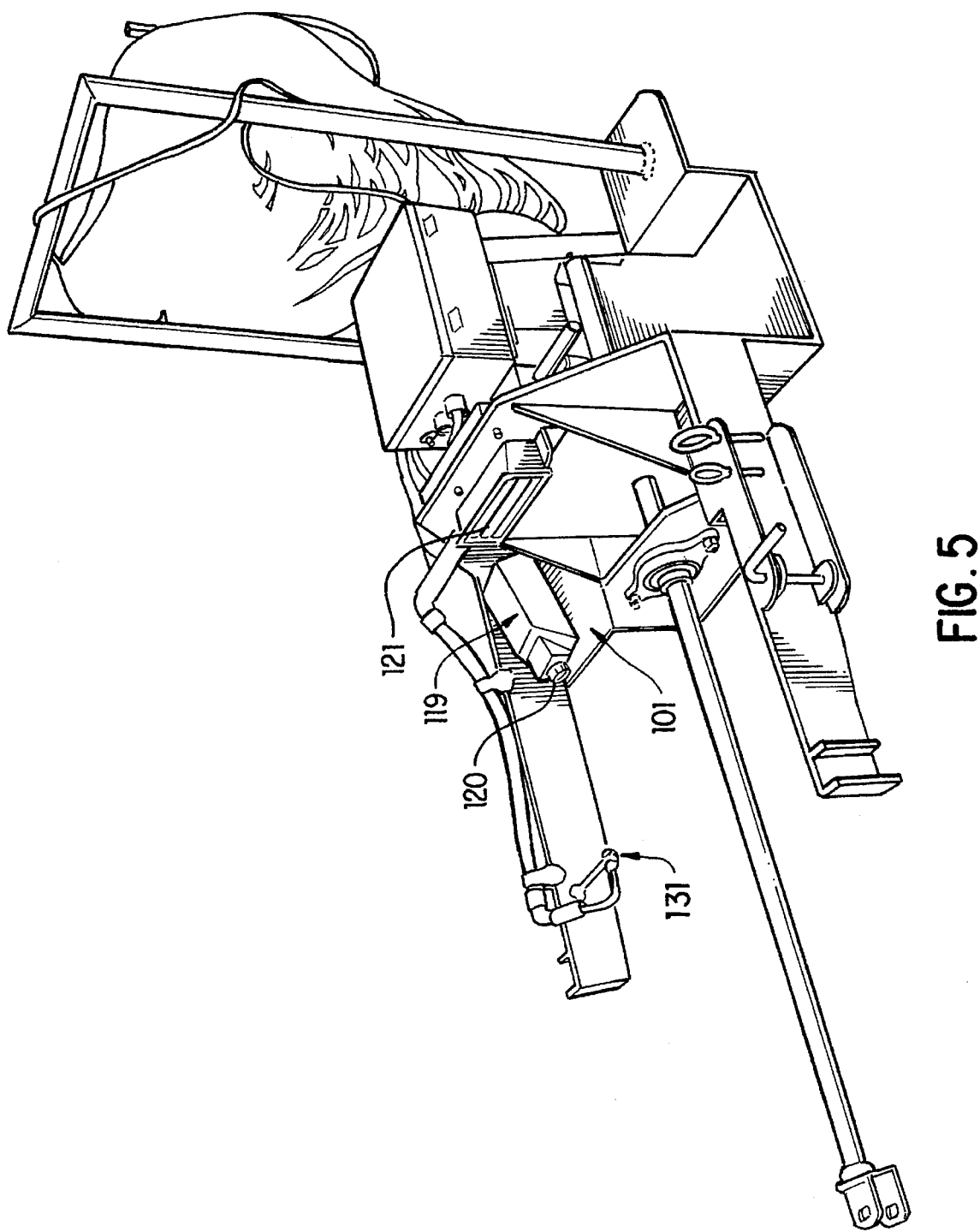
FIG. 5 is an exterior view of the racking assembly of the present invention.
Figure 6:
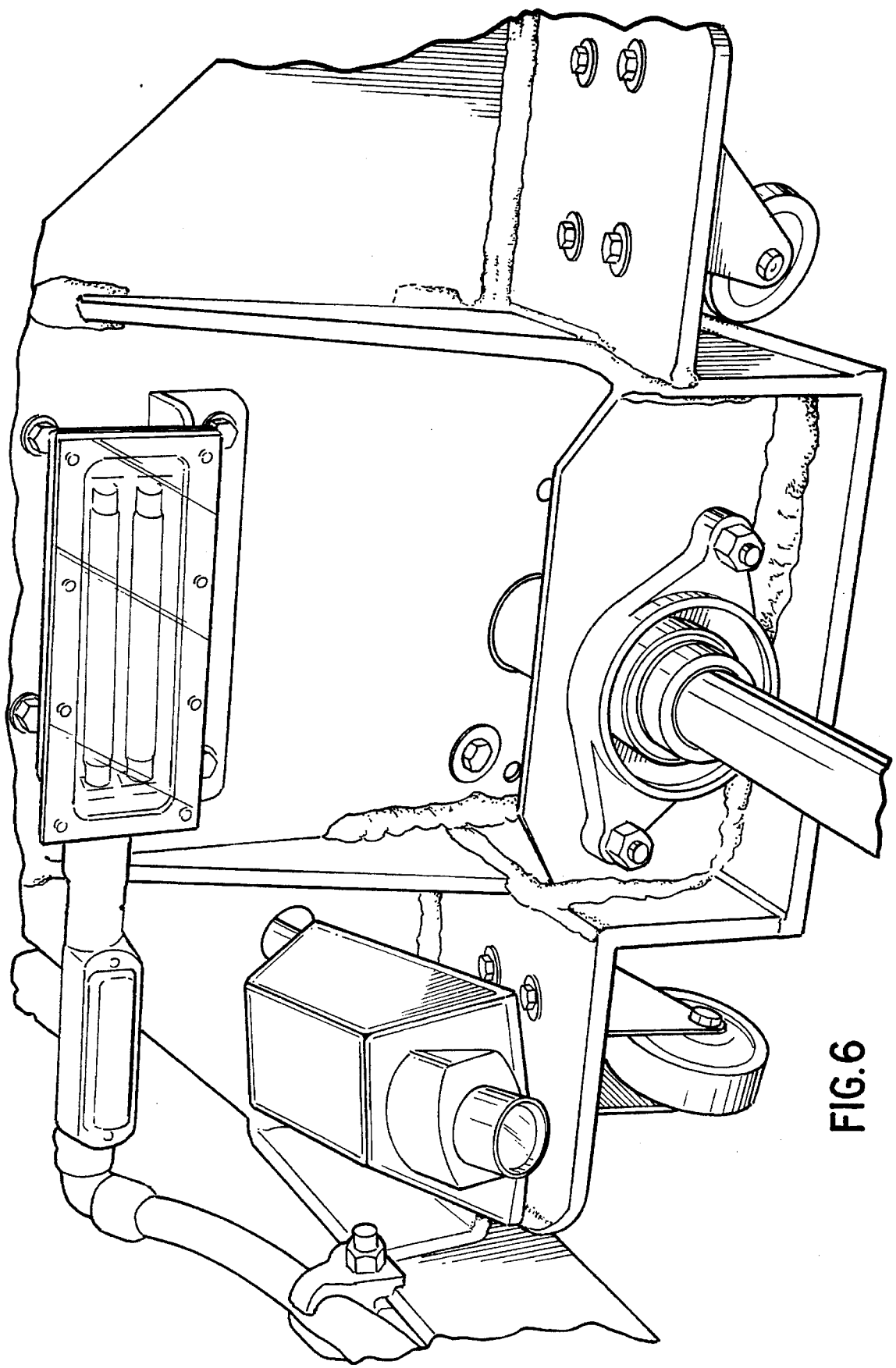
FIG. 6 is a view similar to that of FIG. 5 and illustrating the exterior of the rod assembly, camera and lighting means of the racking assembly.
Figure 7:
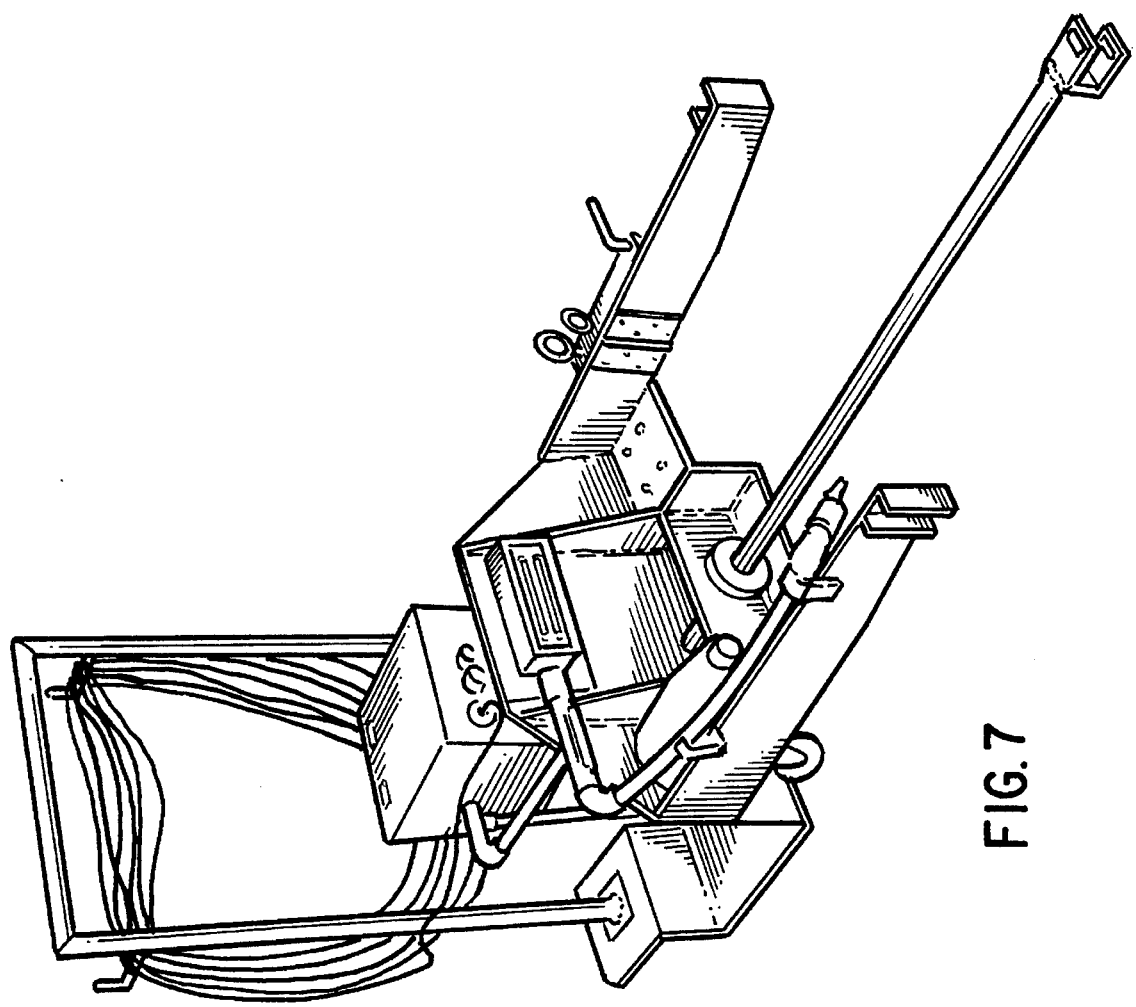
FIG. 7 is a view similar to that of FIG. 5 but illustrating a side exterior view of the device.
Figure 8:
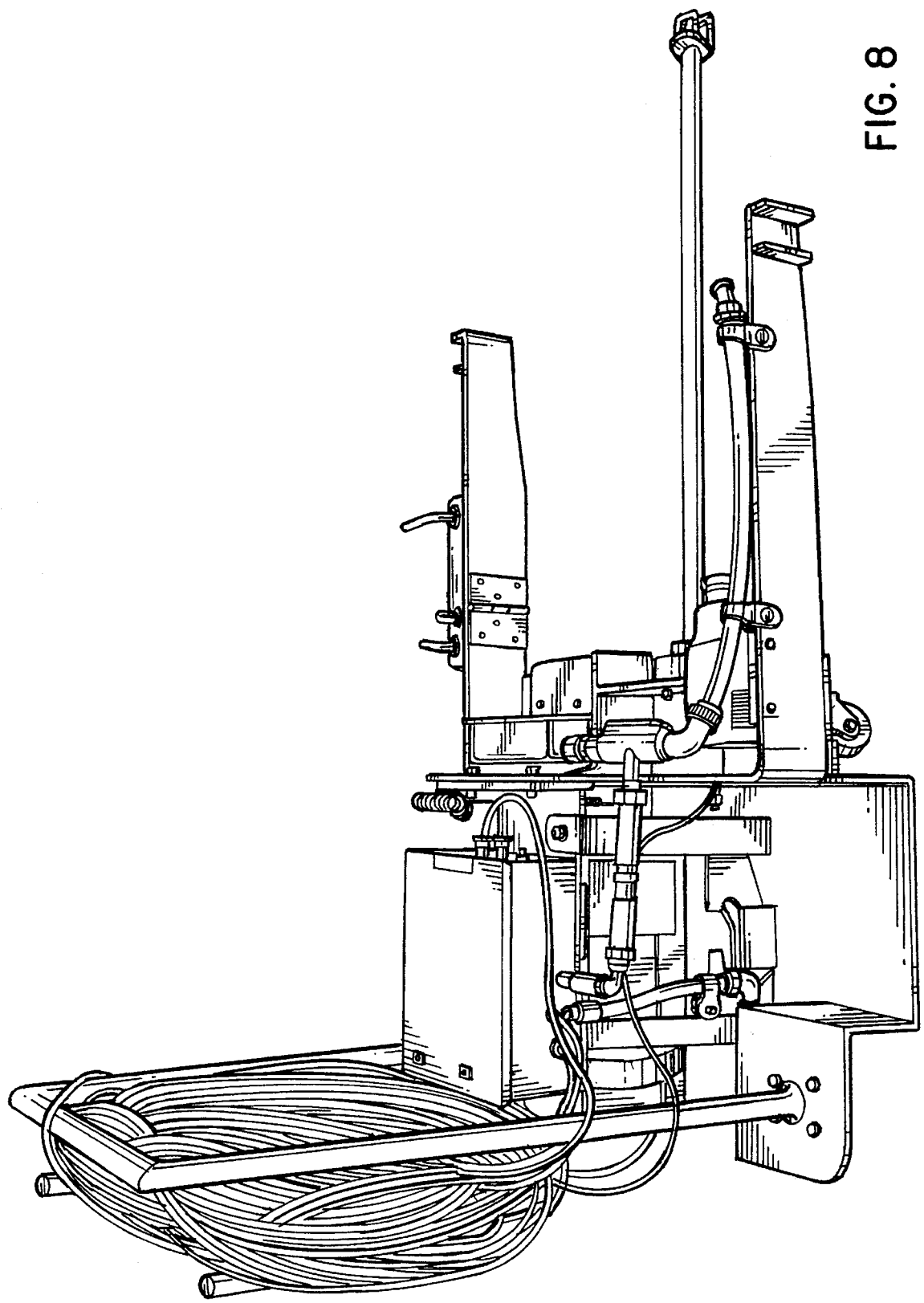
FIG. 8 is another exterior view of the present device, particularly illustrating the first stabilized arm and a second pivotable stabilizing arm lateral thereof.

As shown in FIGS. 5 and 7, a video camera 119 is positioned on the base 101 and interior of the arm 111 for visually observing movements of the device 100 during racking. The camera 119 has a frontal lens assembly 120 of know construction. The camera 119 may be any one of many commercially available video cameras of the small variety type, which are commonly sold for use in conjunction with video cassette recorders. The camera 119 may be secured relative to the base 101 in fixed position, or alternatively, may be fixed thereto for lateral and/or rotary movements either by manual or other known means.

A light 121 (FIG. 11) is provided frontal of a base member 101 and is directed toward the circuit breaker housing E and circuit breaker M therein to enhance visual observation of the racking procedure through the camera 119.

Figure 9:
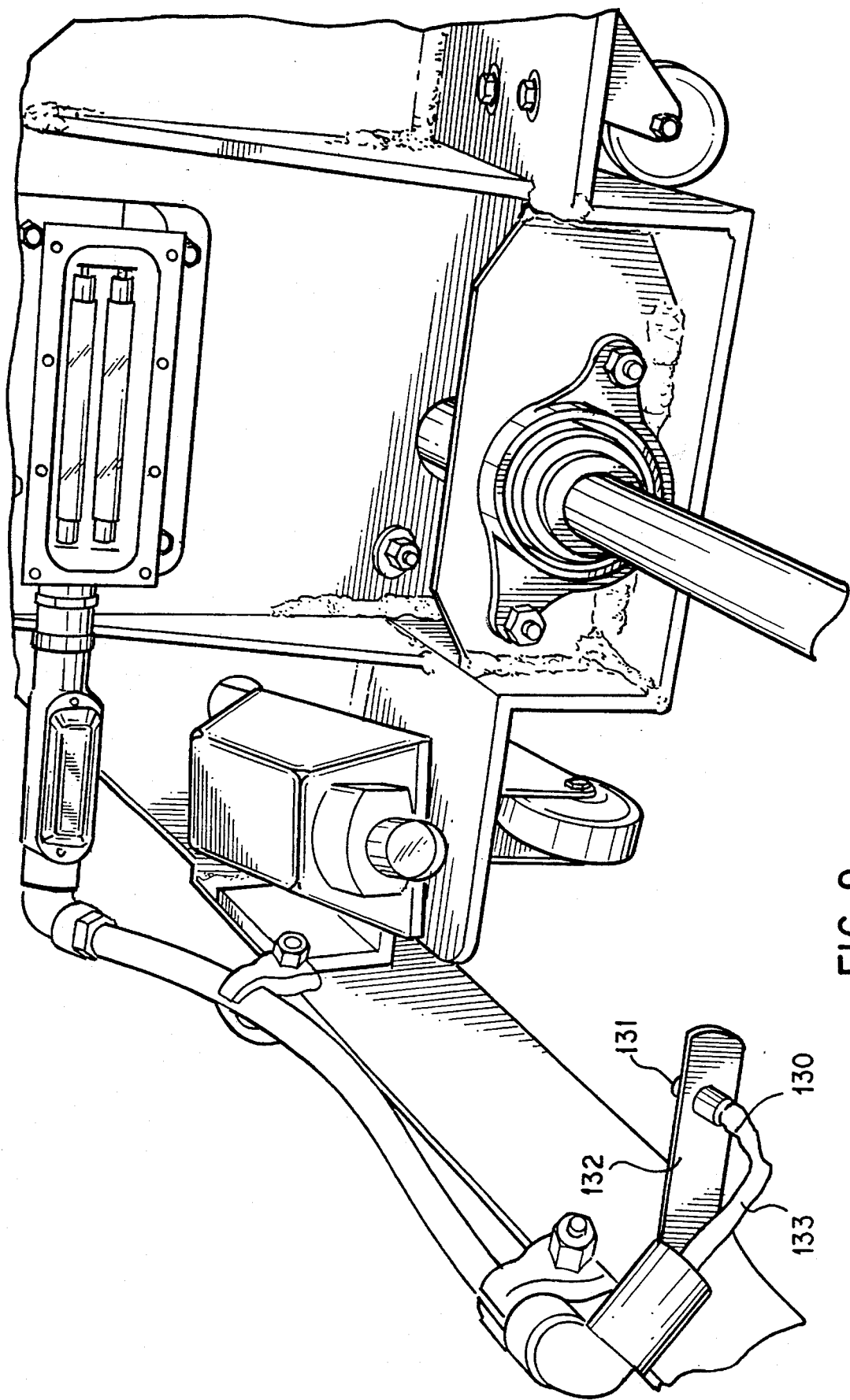
FIG. 9 is a view similar to that of FIG. 6, but further illustrating the light mechanism detectable through the lens of the camera for indication of full racked position, either in or out of the circuit breaker.
Figure 12:
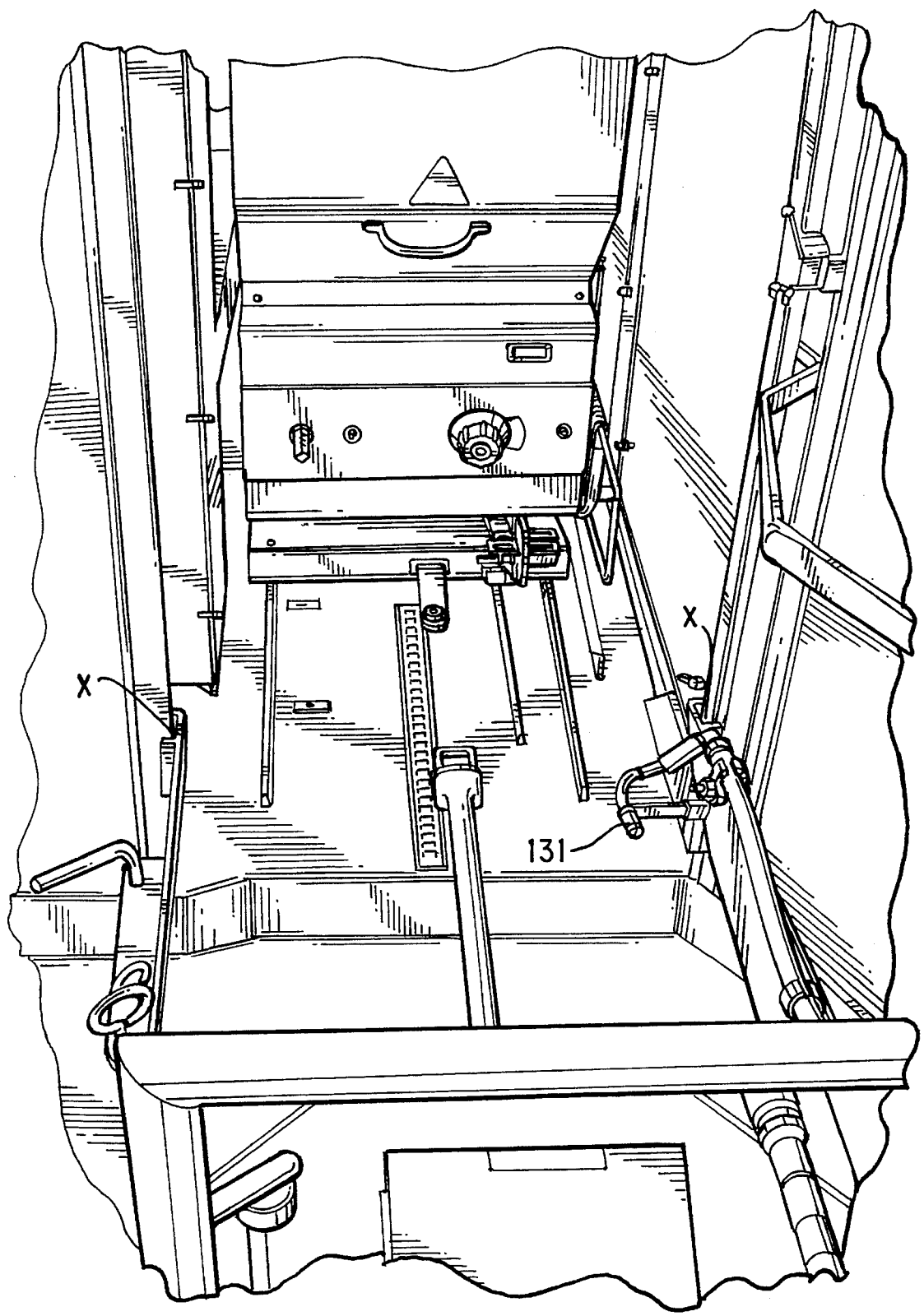
FIG. 12 is a view of the circuit breaker and circuit breaker housing in conjunction with the present racking device, the racking device shown in fixed position relative to the housing prior to, racking out of the circuit breaker.
Figure 13:
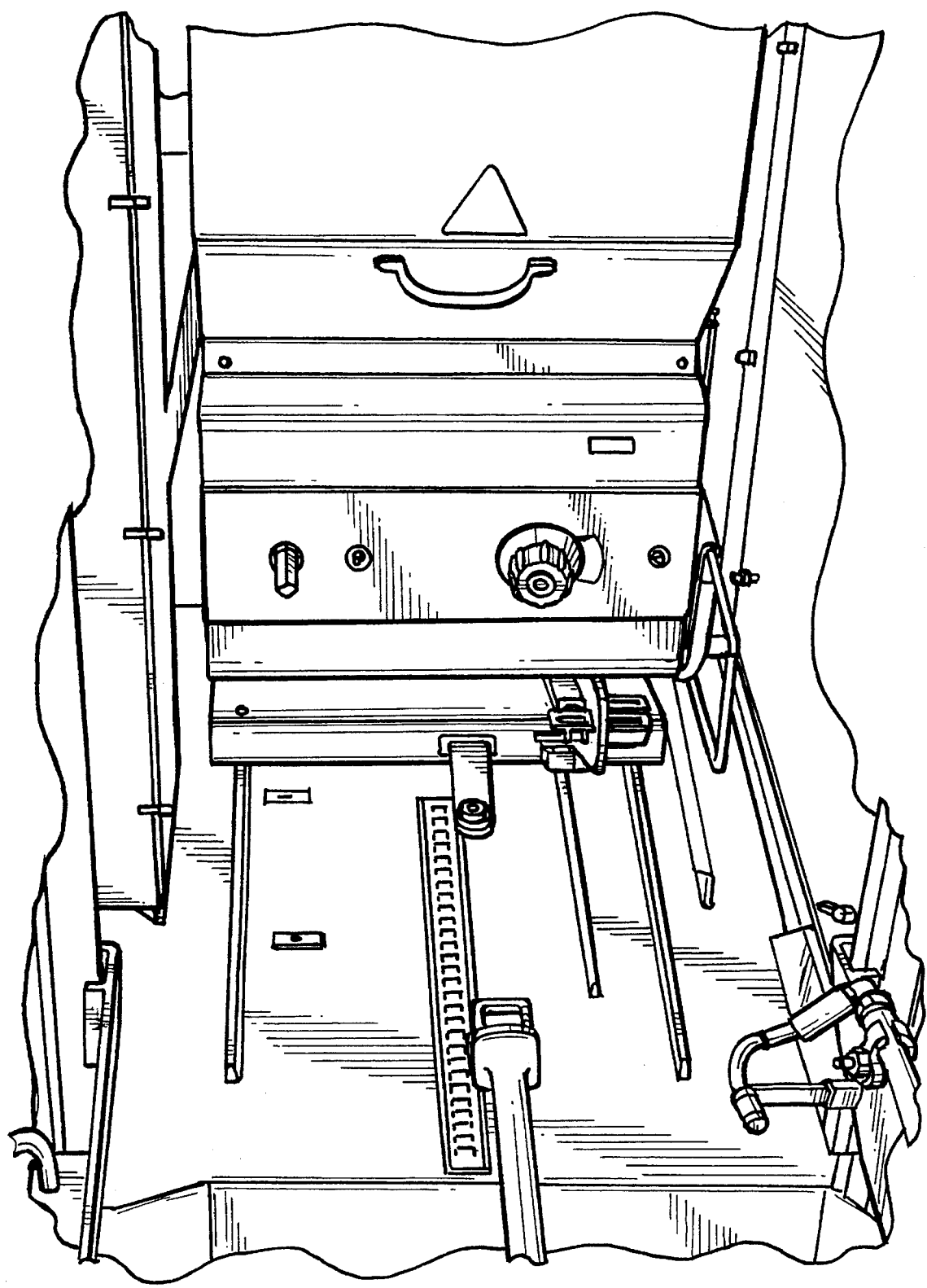
FIG. 13 is a view very similar to FIG. 12, but showing the circuit breaker in racked-out position, subsequent to racking, and further, illustrating the prior art coging mechanism defined on the floor of the circuit breaker housing.
Figure 14:
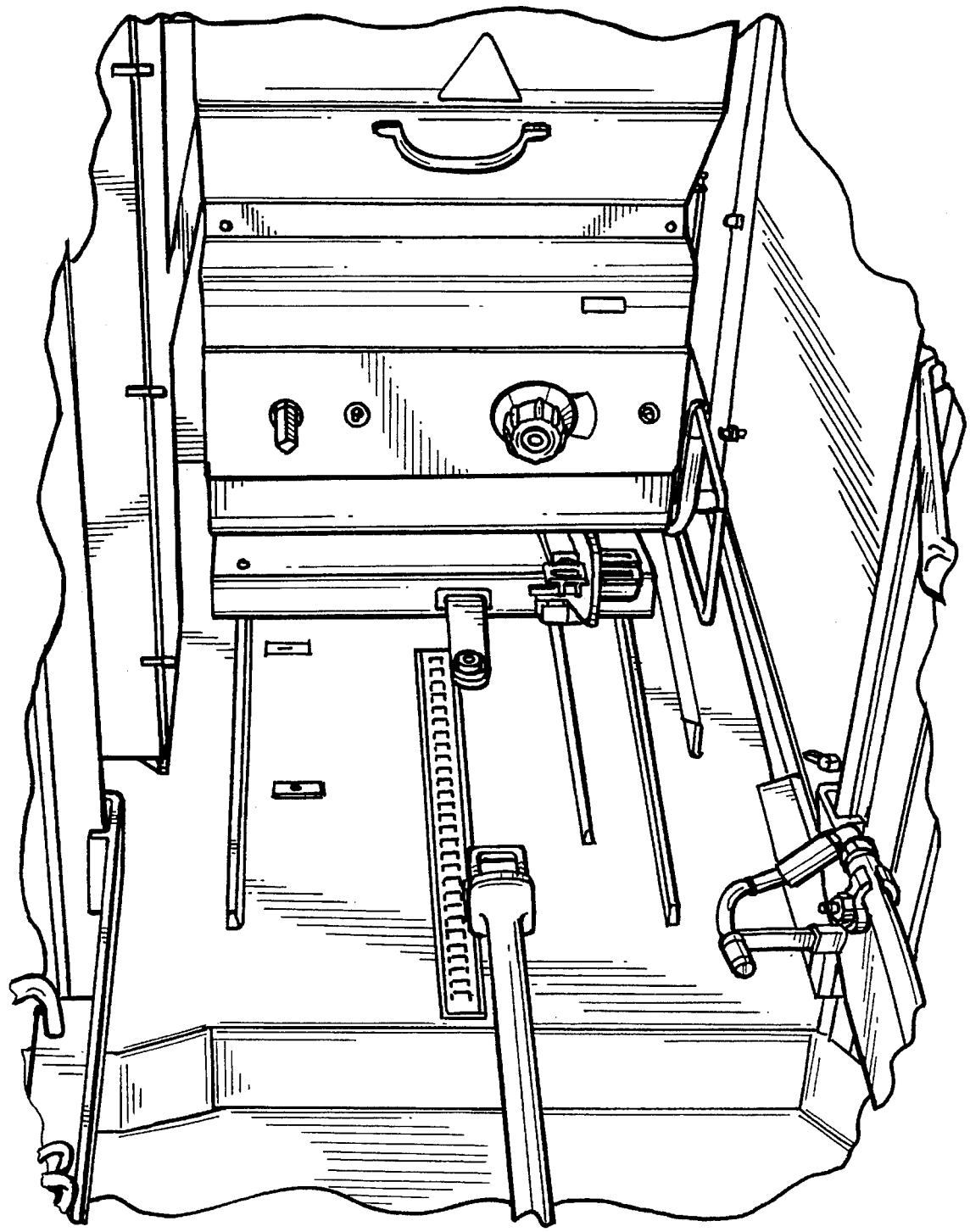
FIG. 14 is a somewhat enlarged view as shown in FIG. 13 with the rod assembly extending away from one end of the arms of the device.

Also as shown in FIGS. 5, 9 and 12, there is provided a visible indicator means 130 (FIG. 9) with a bulb 131 (FIG. 12) facing the camera 119 and detectable by the lens 120 thereof. The member 130 is secured in place by means of plate 132 extending laterally away from the interior side of one of the arms 111, 112, and preferably arm 111. An electric conduit 133 extends from the member 130 to the circuitry within box 107 for coordinating movements of the device 100 and indicating racked-in, racked-out positions of the circuit breaker M such that the bulb 131 is electrically activated to colorize same, such as red, to indicate either completely racked-in or racked-out position.

The activation of the bulb 131 is, of course, immediately detected through the lens 120 of the camera 119, and that video signal is transmitted by the camera 119 through a video signal transmitting conduit (134') to a television monitor 134 (FIG. 16) at a point of safety. When the racked-in or racked-out position is detected by the bulb 131 in either bulb activated or bulb deactivated mode, such a position will be indicated at the television monitor 134 and a human operator may immediately thereafter activate a signal at the point of safety for either activating or deactivating the motor means and stop rod assembly manipulation at or beyond such point.

The indicator means 130 correlates electrically relative to the position of the rod assembly 103 in known fashion such that an electric signal is either broken or established with the circuit breaker M is at the fully racked-in or racked-out positions. Such a signalling means which may also be the use of two or more color indicator bulbs, may either be mechanical movements resistance activatable or based upon the length of the rod assembly 103 at a fixed extended length relative to the securement of the apparatus 100 at track X and/or the position of the rod assembly 103 relative to the distal end of the sides 103c' and 103c". Such a calculation and circuitry and mechanical parts therefor may be effected in a variety of manners known to those skilled in the art. Thus, the invention is not necessarily limited to the use of any particular means of activation of the indicator means 130.

As shown in FIG. 16, the television monitor 134 has an electric line 135 and plug 136 extending therefrom. A line 137 extends from the television to the camera 119 for transmission of the camera signals to the television monitor 64.

Additionally, also shown in FIG. 16, a control box 138 is provided having an electric connecting line 139 and a plurality of switches 140 through lines 140*a*, 140*b*, and 140*c* for activating the motor means, the camera, and the light in conjunction with the use of the present invention.

It will be appreciated that the circuit breaker M may be either manually or, preferably, mechanically through the use of the device 100, manipulatable to further move the circuit breaker M away from the housing member N therefor during racking-out.

The light 121 is preferably of the fluorescent type and is provided for purposes of increasing lighting in the proximate area of the racking procedure, thus enhancing images detected by the lens 120 of the camera 119. The light 121 has, of course, an electric conduit extending therefrom and may be plugged into an AC circuit immediate the circuit breaker housing L or extendable to the point of safety and activated by a button or the like extending between the length of line therefor and another line portion extending from the button or the like to an AC connection in the wall at the point of safety. Alternatively, the light 121 may be battery operated with a series of one or more batteries associated therewith and provided on the apparatus 100, or by DC line operably established as with the AC line as described above.

It will also be appreciated that the camera 119, and motor means 106 may be equally activated through DC power line and switch means at the point of safety.

Although the invention has been described in terms of specified embodiments which are set forth in detail, it should be understood that this is by illustration only and that the invention is not necessarily limited thereto, since alternative embodiments and operating techniques will be become apparent to those skilled in the art in view of the disclosure. Accordingly, modifications are contemplated which can be made without departing from the spirit of the described invention.

What is claimed and desired to be secured by Letters Patent is:

1. A transportable remotely actuated racking device for use in connection with insertion and removal of high voltage industrial electric circuit breakers from housings therefore, comprising:
   (1) a base;
   (2) means extending from said base for transporting said device from approximate one of said circuit breakers to approximate another of said circuit breakers, and for aligning said device relative to said circuit breaker housing during racking;
   (3) a rod assembly having a fixed length and a distal end, communicating with said base and selectively movable from a first position, wherein said rod assembly is not in grasping relationship with said circuit breaker to a second position, wherein said rod assembly is in position for establishing a grasping relationship with said circuit breaker, to a third position during racking;
   (4) grasping means secured to the distal end of said rod assembly for grasping and holding said circuit breaker during racking;
   (5) motor means on said base for manipulating said rod assembly between first, second and third positions;
   (6) at least one fixed stabilizing arm element extending away from said base toward said circuit breaker housing, said arm element having a length less than that of said rod assembly;
   (7) means on said arm element arranged for selective grasping engagement with said circuit breaker housing during racking; and
   (8) activation/deactivation means for said motor means and manually manipulatable at a remote point of safety relative to said circuit breaker housing.

2. The device of claim 1 wherein said rod assembly has exteriorly engrooved thereon a thread-like screw configuration, and further including a gear assembly carried by said frame for interrelated and operative association with said motor means for conversion of rotary movements generated by said motor means to linear movements of said rod assembly.

3. The device of claim 1 further including a pivotable second stabilizing arm, said stabilizing arm including means for pivoting movement of said second stabilizing arm relative to said one fixed stabilizing arm and further relative to said circuit breaker housing.

4. The device of claim 3 further including means on said pivotable second stabilizing arm arranged for selective grasping engagement with said circuit breaker housing during racking.

5. The device of claim 1 wherein said rod assembly is selectively horizontally movable between said first and second positions.

6. The device of claim 1 wherein said motor means includes an electrically operating motor.

7. The device of claim 1 wherein said motor means includes gearing means for transfer of rotary movements generated by said motor means to at least one of horizontal and vertical movements of said rod assembly.

8. The device of claim 1 further including electronic camera means for transmission of continuous picture signals to said remote point of safety for indication of the relationship between said rod assembly and said circuit breaker during racking.

9. The device of claim 8 further including closed circuit means for monitoring said signals at said point of safety.

10. The device of claim 1 further including electric signal generating means for visual indication at said point of safety of circuit engagement and/or circuit disengagement of said circuit breaker in said housing during racking.

11. The device of claim 8 further including electric signal generating means for visual indication at said point of safety of circuit engagement and/or circuit disengagement of said circuit breaker in said housing, during racking, said signals of said signal means being visually directed at and to said camera means and observable through said means for monitoring said signals at said point of safety to indicate racked-in and racked-out positions of said circuit breaker.

12. The device of claim 1, said grasping means further including means for receipt of locking means extending through said circuit breaker and said grasping means during racking.

13. A method of racking a high voltage industrial electric circuit breaker in a housing therefor, including the steps of:
   (a) moving a racking device into proximity to said circuit breaker housing, said racking device including:
      1) a base;
      2) means extending from said base for transporting said device from approximate one of said circuit breakers to approximate another of said circuit breakers, and for aligning said device relative to said circuit breaker housing during racking;
3) a rod assembly having a fixed length and a distal end, communicating with said base and selectively movable from a first position, wherein said rod assembly is not in grasping relationship with said circuit breaker to a second position, wherein said rod assembly is in position for establishing a grasping relationship with said circuit breaker, to a third position during racking;
4) grasping means secured to the distal end of said rod assembly for grasping and holding said circuit breaker during racking;
5) motor means on said base for manipulating said rod assembly between first, second and third positions;
6) at least one fixed stabilizing arm element extending away from said base toward said circuit breaker housing, said arm element having a length less than that of said rod assembly;
7) means on said arm element arranged for selective grasping engagement with said circuit breaker housing during racking;
8) activation/deactivation means for said motor means and manually manipulatable at a remote point of safety relative to said circuit breaker housing;

(b) moving said one fixed stabilizing arm element into contact relationship with said circuit breaker housing;
(c) manipulating said means on said stabilizing arm element into grasping engagement with said circuit breaker housing;
(d) aligning said rod assembly with said circuit breaker;
(e) actuating said motor means to manipulate the rod assembly from said first position to said second position;
(f) grasping and holding said circuit breaker by securing said grasping means and one end of said circuit breaker; and
(g) activating said motor means to manipulate said rod assembly from said second position to said third position and thereafter toward said first position, whereby said circuit breaker is disengaged from said housing.

14. A method of racking a high voltage industrial electric circuit breaker in a housing therefor, including the steps of:
(a) moving a racking device into proximity into said circuit breaker housing, said racking device including:
1) a base;
2) means extending from said base for transporting said device from approximate one of said circuit breakers to approximate another of said circuit breakers, and for aligning said device relative to said circuit breaker housing during racking;
3) a rod assembly having a fixed length and a distal end, communicating with said base and selectively movable from a first position, wherein said rod assembly is not in grasping relationship with said circuit breaker to a second position, wherein said rod assembly is in position for establishing a grasping relationship with said circuit breaker, to a third position during racking;
4) grasping means secured to the distal end of said rod assembly for grasping and holding said circuit breaker during racking;
5) motor means on said base for manipulating said rod assembly between first, second and third positions;
6) at least one fixed stabilizing arm element extending away from said base toward said circuit breaker housing, said arm element having a length less than that of said rod assembly;
7) means on said arm element arranged for selective grasping engagement with said circuit breaker housing during racking;
8) activation/deactivation means for said motor means and manually manipulatable at a remote point of safety relative to said circuit breaker housing;

(b) moving said one fixed stabilizing arm element into contact relationship with said circuit breaker housing;
(c) manipulating said means on said stabilizing arm element into grasping engagement with said circuit breaker housing;
(d) aligning said rod assembly with said circuit breaker;
(e) actuating said motor means to manipulate the rod assembly from said first position to said second position;
(f) grasping and holding said circuit breaker by securing said grasping means and one end of said circuit breaker; and
(g) activating said motor means to manipulate said rod assembly from said second position toward one of said first and third positions, whereby said circuit breaker is racked into or out of said circuit breaker housing.

15. A method of racking a high voltage industrial electric circuit breaker in a housing therefor, including the steps of:
(a) moving a racking device into proximity to said circuit breaker housing, said racking device including:
1) a base;
2) means extending from said base for transporting said device from approximate one of said circuit breakers to approximate another of said circuit breakers, and for aligning said device relative to said circuit breaker housing during racking;
3) a rod assembly having a fixed length, communicating with said base and selectively movable from a first position, wherein said rod assembly is not in grasping relationship with said circuit breaker to a second position, wherein said rod assembly is in position for establishing a grasping relationship with said circuit breaker, to a third position during racking;
4) grasping means secured to the distal end of said rod assembly for grasping and holding said circuit breaker during racking;
5) motor means on said base for manipulating said rod assembly between first, second and third positions;
6) at least one fixed stabilizing arm element extending away from said base toward said circuit breaker housing, said arm element having a length less than that of said rod assembly;
7) means on said arm element arranged for selective grasping engagement with said circuit breaker housing during racking;
8) activation/deactivation means for said motor means and manually manipulatable at a remote point of safety relative to said circuit breaker housing;
9) electronic camera means for transmission of continuous picture signals to said remote point of safety for indication of the relationship of said rod assembly to said circuit breaker during racking;
10) means for monitoring said signals at said point of safety;

(b) moving said one fixed stabilizing arm element into contact relationship with said circuit breaker housing;

(c) manipulating said means on said arm element into grasping engagement with said circuit breaker housing;

(d) aligning said rod assembly with said circuit breaker;

(e) actuating said motor means to manipulate the rod assembly from said first position to said second position;

(f) grasping and holding said circuit breaker by securing said grasping means and one end of said circuit breaker;

(g) activating said motor means to manipulate said rod assembly from said second position toward one of said first and third positions, whereby said circuit breaker is racked into or out of said circuit breaker housing; and (h) activating said electronic camera means and said monitoring means during at least step (g).

16. A method of racking a high voltage industrial electric circuit breaker in a housing therefor, including the steps of:

(a) moving a racking device into proximity to said circuit breaker housing, said racking device including:
 1) a base;
 2) means extending from said base for transporting said device from approximate one of said circuit breakers to approximate another of said circuit breakers, and for aligning said device relative to said circuit breaker housing during racking;
 3) a rod assembly having a fixed length, communicating with said base and selectively movable from a first position, wherein said rod assembly is not in grasping relationship with said circuit breaker to a second position, wherein said rod assembly is in position for establishing a grasping relationship with said circuit breaker, to a third position during racking;
 4) grasping means secured to the distal end of said rod assembly for grasping and holding said circuit breaker during racking;
 5) motor means on said base for manipulating said rod assembly between first, second and third positions;
 6) at least one fixed stabilizing arm element extending away from said base toward said circuit breaker housing, said arm element having a length less than that of said rod assembly;
 7) means on said arm element arranged for selective grasping engagement with said circuit breaker housing during racking;
 8) activation/deactivation means for said motor means and manually manipulatable at a remote point of safety relative to said circuit breaker housing;
 9) electronic camera means for transmission of continuous picture signals to said remote point of safety for indication of the relationship of said rod assembly to said circuit breaker during racking;
 10) means for monitoring said signals at said point of safety;

(b) moving said one fixed stabilizing arm element into contact relationship with said circuit breaker housing;

(c) manipulating said means on said arm element into grasping engagement with said circuit breaker housing;

(d) aligning said rod assembly with said circuit breaker;

(e) actuating said motor means to manipulate the rod assembly from said first position to said second position;

(f) grasping and holding said circuit breaker by securing said grasping means and one end of said circuit breaker;

(g) activating said motor means to manipulate said rod assembly from said second position toward one of said first and third positions, whereby said circuit breaker is racked into or out of said circuit breaker housing;

(h) activating said electronic camera means and said monitoring means during at least step (g); and (i) manipulating said electric signal generating means during at least step (g) to indicate racked-in and/or racked-out positions.

* * * * *